United States Patent
Nettles (10) Patent No.: US 8,950,975 B2
(45) Date of Patent: Feb. 10, 2015

(54) SYSTEM AND METHOD FOR SHORELINE PRESERVATION

(71) Applicant: Deron Nettles, Mt. Pleasant, SC (US)

(72) Inventor: Deron Nettles, Mt. Pleasant, SC (US)

( * ) Notice: Subject to any disclaimer, the term of this patent is extended or adjusted under 35 U.S.C. 154(b) by 0 days.

(21) Appl. No.: 13/910,893

(22) Filed: Jun. 5, 2013

(65) Prior Publication Data

US 2013/0322966 A1 Dec. 5, 2013

Related U.S. Application Data

(60) Provisional application No. 61/655,765, filed on Jun. 5, 2012.

(51) Int. Cl.
*E02B 3/06* (2006.01)
*E02B 3/10* (2006.01)

(52) U.S. Cl.
CPC .. *E02B 3/06* (2013.01); *E02B 3/106* (2013.01)
USPC ............................................. 405/21; 405/15

(58) Field of Classification Search
CPC ............ E02B 3/06; E02B 3/066; E02B 3/106
USPC ................. 405/15, 21, 33, 283, 285
See application file for complete search history.

(56) References Cited

U.S. PATENT DOCUMENTS

| | | |
|---|---|---|
| 1,930,404 A | 10/1933 | Wagner |
| 2,795,399 A | 6/1957 | Anderson |
| 3,011,316 A * | 12/1961 | Wilson ............................ 405/28 |
| 3,474,786 A | 10/1969 | Luebke |
| 3,962,827 A | 6/1976 | Chaffee |
| 4,089,179 A | 5/1978 | Trautman |
| 4,576,364 A | 3/1986 | O'Fearna |
| 4,627,766 A | 12/1986 | Marquet |
| 4,671,495 A | 6/1987 | Garland et al. |
| 4,690,384 A | 9/1987 | Palmer |
| 5,360,296 A * | 11/1994 | Angelette ..................... 405/285 |
| 5,368,416 A * | 11/1994 | Cataldo .......................... 405/285 |
| 5,758,868 A | 6/1998 | Shea |
| 6,371,699 B1 * | 4/2002 | Weinreb ........................ 405/262 |
| 6,443,655 B1 * | 9/2002 | Bennett ......................... 405/114 |
| 6,481,926 B2 | 11/2002 | Benedict et al. |
| 6,558,075 B2 | 5/2003 | Benedict et al. |
| 6,722,817 B2 | 4/2004 | Benedict et al. |
| 7,021,868 B1 * | 4/2006 | Farrag et al. ................. 405/283 |
| 7,390,141 B2 | 6/2008 | Rytand |
| 7,690,628 B2 * | 4/2010 | Hewitt et al. ................... 256/54 |
| 7,775,746 B2 * | 8/2010 | Kim et al. ..................... 405/286 |
| 7,798,748 B2 * | 9/2010 | La ................................. 405/285 |
| 2003/0223824 A1 * | 12/2003 | Jordan .......................... 405/284 |

FOREIGN PATENT DOCUMENTS

| | | |
|---|---|---|
| AU | 2008201576 | 10/2009 |
| DE | 19807141 A1 | 9/1999 |
| NL | 1027473 C2 | 6/2005 |
| RU | 2310034 C2 | 10/2007 |

* cited by examiner

*Primary Examiner* — Benjamin Fiorello
(74) *Attorney, Agent, or Firm* — Smith Risley Tempel Santos LLC; Daniel J. Santos; Matthew T. Hoots (57) ABSTRACT

Disclosed is a removable erosion-control and fencing ("REAF") system for shoreline preservation along a line defined by a plurality of posts. An exemplary REAF system comprises first and second post clamp pairs mounted to adjacent posts. Each post clamp pair "sandwiches" a post and is fixedly attached to the post by virtue of fasteners that lock one half of the post clamp pair to its other half. In this way, the post clamp pair "hugs" the post and is secured thereon without having to be permanently fixed to the post or damaging the structural rigidity of the post. Each post clamp pair includes a substantially vertical wall slot such that one or more cross-members may be received into the walls slots to form a wall section in a space defined between the adjacent posts.

20 Claims, 13 Drawing Sheets

SYSTEM AND METHOD FOR SHORELINE PRESERVATION

CROSS-REFERENCE TO RELATED APPLICATIONS

Priority is hereby claimed under 35 U.S.C. §119(e) to U.S. provisional application entitled "A REMOVABLE EROSION CONTROL AND FENCING SYSTEM THAT IS DESIGNED FOR FAST INSTALLATIONS," filed on Jun. 5, 2012 and assigned application Ser. No. 61/655,765, the entire contents of which are hereby incorporated by reference.

BACKGROUND

The maintenance and preservation of shorelines is an ever present concern for owners of structures located near large bodies of water. As the water continually laps against the shoreline or crashes into it wave after wave, the definition of the shoreline is prone to constant shifting and eroding. As one of ordinary skill in the art would understand, this constant shifting and eroding of the shoreline can cause problems for structures situated near it.

For instance, during a high tide or storm a beachfront house built atop pilings may experience waves crashing in front of and/or beneath it. As each wave crashes, water and sediment are thrown violently against the portion of the shoreline that is in front of or beneath the beachfront house. And, as each wave recedes after its crash, the shoreline itself is eroded away. Over time, this crashing and eroding inevitably combine to redefine the shoreline edge and, at some point, may turn the beachfront home into an "in front of the beach" home.

A common method for combating shoreline erosion is to construct a permanent wall, fence or seawall to act as a bulkhead between the structure and the water's edge. The bulkhead may be constructed from marine treated slats mounted to a series of posts, concrete block mortared to footings, piled up stones or sandbags, sheet metal driven into the ground and backed by pylons, or just about anything that stands a chance of holding up to the elements. As opposed to being a standalone structure, some bulkheads may actually be constructed from cross members permanently attached to the pilings that support a pier, beachfront home or other structure. Regardless of the specific construction, a permanent bulkhead serves as a retaining system for the shoreline behind it (where a structure such as a home may be located) and also as a barrier for preventing wave erosion.

Notably, shoreline preservation systems that take the form of a permanent bulkhead are considered "Hard Fixed Erosion Control Devices" that are outlawed in many areas. The permanent nature of their construction is considered by many authorities to be detrimental to the long term health of the shoreline and its ecosystem. Additionally, permanent bulkheads that are built off of pilings (such as a beachfront home pilings or pier pylons) can damage the pilings to such an extent that the structural integrity is compromised. Moreover, permanent bulkheads are often expensive and labor intensive to construct. Therefore, what is needed in the art is a system and method for shoreline preservation which is non-permanent and easily constructed. Further, what is needed in the art is a system and method for shoreline preservation that does not compromise the structural integrity of pilings or pylons.

BRIEF SUMMARY

The presently disclosed embodiments, as well as features and aspects thereof, are directed towards a system for shoreline preservation along a line defined by a plurality of posts. Depending on the embodiment, the posts may be installed specifically for the purpose of supporting the shoreline preservation system or they may preexist for the purpose of supporting a structure such as a beachfront house, deck or pier. An exemplary shoreline preservations system, termed herein as a removable erosion-control and fencing ("REAF") system, comprises first and second post clamp pairs mounted to adjacent posts. Each post clamp pair "sandwiches" a post and is fixedly attached to the post by virtue of fasteners that lock one half of the post clamp pair to its other half. In this way, the post clamp pair "hugs" the post and is secured thereon without having to be permanently fixed to the post or damaging the structural rigidity of the post.

Further, each post clamp pair includes a substantially vertical wall slot such that a wall slot on one post clamp pair mounted on one post faces a complimentary wall slot on a second post clamp pair that is mounted to an adjacent post. One or more cross-members are subsequently received into the walls slots such that a wall section is formed in a space defined between the adjacent posts.

A REAF system may be used for any number of applications including, but not limited to, fences, straight walls, jagged walls, and T-shaped walls such as is often used for a groin or jetty. An exemplary application of a REAF system may be for management of shoreline erosion. As a wave of water contacts the front-side of a REAF system, water and suspended sediment is forced through and between adjacent cross-members that define a wall section between adjacent posts. Energy carried by the wave is dissipated by virtue of the wave coming into contact with the REAF system and the water having to navigate through the narrow openings between adjacent cross-members of a given wall section. Once the water and sediment carried by a wave passes through the wall section of the REAF system, sand and sediment accretes or accumulates on the backside of the system while the water recedes back through the system. In this way, the integrity of the shoreline on the backside of the REAF system is maintained as well as the integrity of the installation of the various pilings that support the REAF system.

BRIEF DESCRIPTION OF THE SEVERAL VIEWS OF THE DRAWING

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Aspects, features and advantages of several exemplary embodiments of the systems and methods for shoreline preservation will become better understood with regard to the following description in connection with the accompanying drawing(s). It should be apparent to those skilled in the art that the described embodiments provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the systems and methods as defined herein and equivalents thereto. Hence, use of absolute terms such as, for example, "will," "will not," "shall," "shall not," "must" and "must not" are not meant to limit the scope of the present invention as the embodiments disclosed herein are merely exemplary. Moreover, the word "exemplary" is used herein to mean "serving as an example, instance, or illustration." Any aspect described herein as "exemplary" is not necessarily to be construed as exclusive, preferred or advantageous over other aspects.

The presently disclosed embodiments, as well as features and aspects thereof, are directed towards providing a system and method for shoreline preservation. Embodiments of the systems and methods for shoreline preservation are referred to herein as removable erosion-control and fencing ("REAF") systems and methods and are useful for, among other purposes, dissipating wave energy and mitigating shoreline erosion.

An advantage of certain embodiments is that the REAF system mounts to existing pylons, pilings or posts (such as may exist for supporting a pier, deck or housing structure) without significantly compromising the structural integrity of those pylons, pilings or posts. A further advantage of certain embodiments is that the method of installing a REAF system is quick, simple and economical when compared to permanent bulkheads. Yet another advantage of certain embodiments of a REAF system is that energy from water waves is dissipated through the system while sand, dirt and sediment is accreted on the backside of the system. In this way, embodiments allow for water in the form of a wave to "crash" through the system and then recede back through while leaving solids on the backside of the system, thus maintaining shoreline integrity and preventing erosion that could compromise the stability of a structure mounted atop the pylons.

Figure 1:
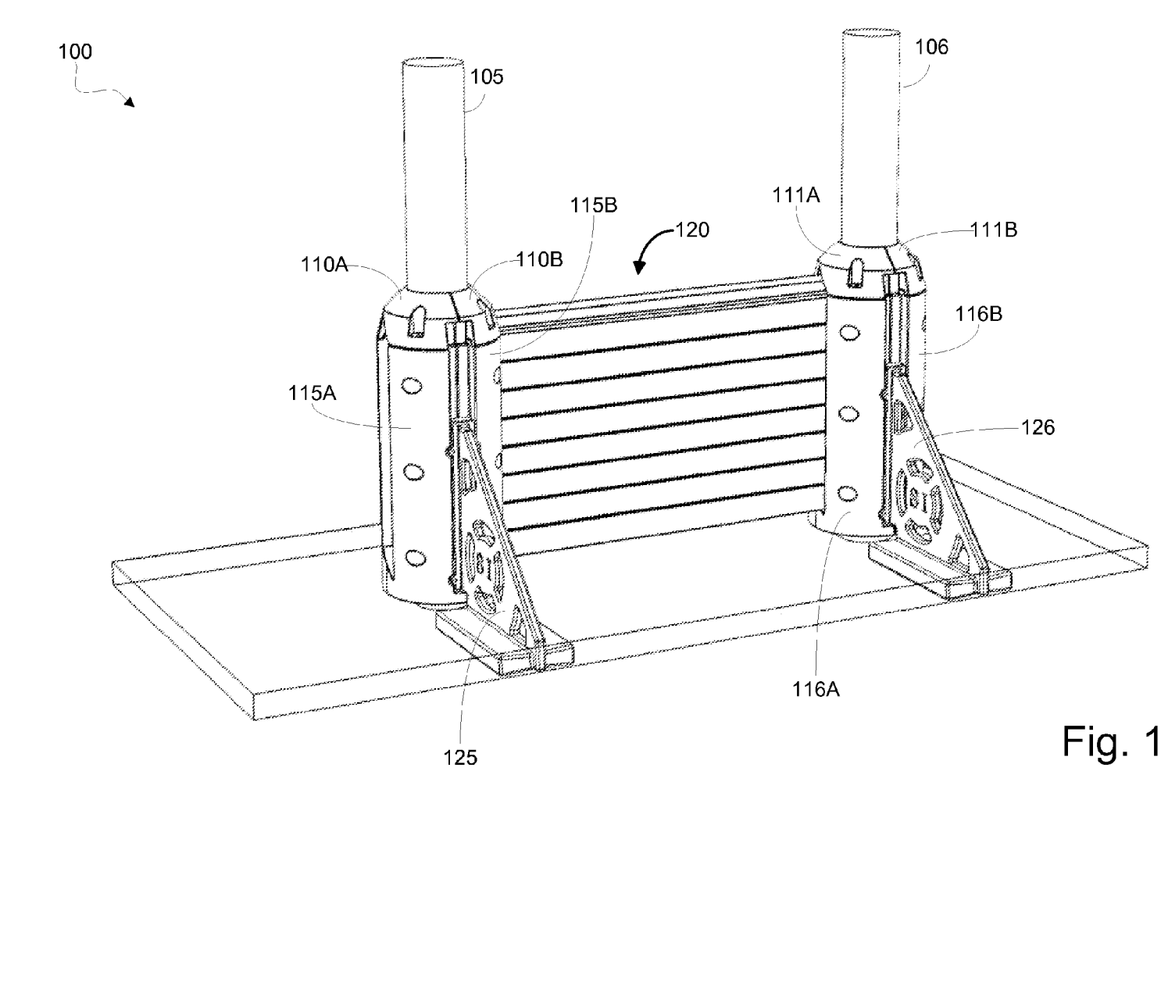
FIG. 1 is a perspective view of a portion of an exemplary removable erosion-control and fencing ("REAF") system mounted between two support posts.

FIG. 1 is a perspective view of a portion of an exemplary REAF system 100 mounted between two support posts 105, 106. As described above, the support posts 105 may initially exist for the purpose of supporting a structure such as a pier, deck or beach house. The exemplary REAF system 100 includes two pairs of post clamps 115, 116 mounted to the support posts 105, 106, respectively. Notably, and as will be better understood from subsequent figures, each pair of post clamps 115, 116 may be configured to "sandwich" a pylon or piling 105, 106.

A series of cross-members 120 are received into opposing vertical groove or channel aspects of the post clamps 115B, 116A in the form of wall slots such that the cross-members 120 form a wall between support posts 105, 106. Once the cross-members 120 have been received into the opposing wall slots, two pairs of locking caps 110, 111 are mounted to the support posts 105, 106 atop the post clamp pairs 115, 116. The locking cap pairs 110, 111 serve to secure the cross-members 120 in the opposing wall slots of post clamps 115B, 116A.

The exemplary REAF system 100 further includes a pair of exemplary deadman anchor components 125, 126 received into a vertical groove or channel aspect, i.e. a deadman slot, created by each post clamp pair 115, 116, respectively. It is envisioned that the deadman anchor components 125, 126 are not necessarily comprised within all embodiment of a REAF system; however, as would be understood by one of ordinary skill in the art, deadman anchor components 125, 126 may provide additional structural rigidity to the REAF system 100 by providing a force on the backside of the posts 105, 106.

It is envisioned that various components within a REAF system may be constructed from any number of materials including, but not limited to, plastic, wood, concrete, ceramic, galvanized steel, aluminum or any material suited for a particular application. As such, the scope of a REAF system 100 is not limited by its materials of construction, although certain material choices may be advantageous over others depending on the embodiment.

FIGS. 2A-2J illustrate a method for constructing the exemplary REAF system 100 of FIG. 1. Beginning with FIG. 2A, a pair of posts 105, 106 are illustrated as being anchored in the ground 101, such as along a beachfront. Notably, it is envisioned that the posts 105, 106 may preexist for the purpose of supporting a structure such as a beach house, pier or deck. Even so, it is also envisioned that some embodiments of a REAF system 100 may include posts 105, 106 that have been anchored in the ground 101 explicitly for the purpose of supporting a REAF system.

Figure 2A:
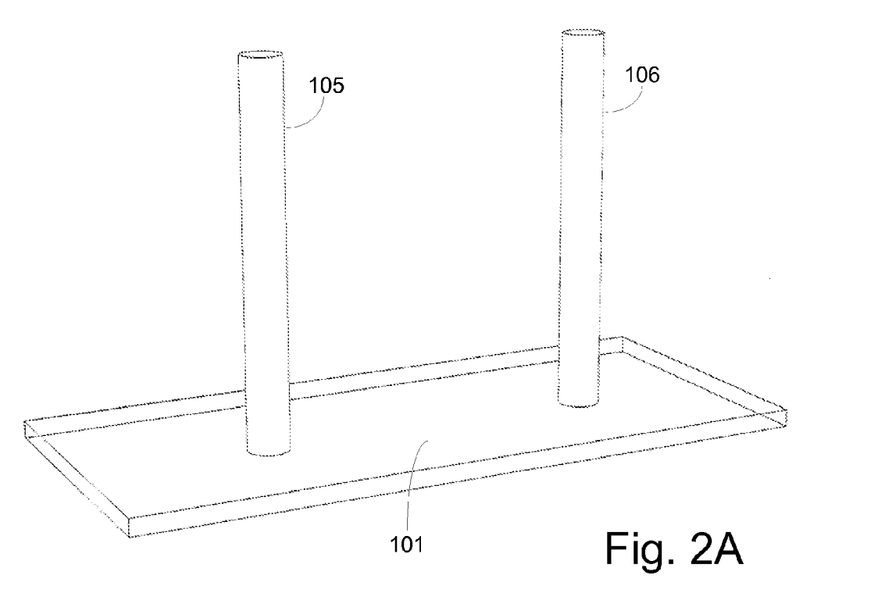
FIGS. 2A-2J illustrate a method for constructing the exemplary REAF system of FIG. 1.
Figure 2B:
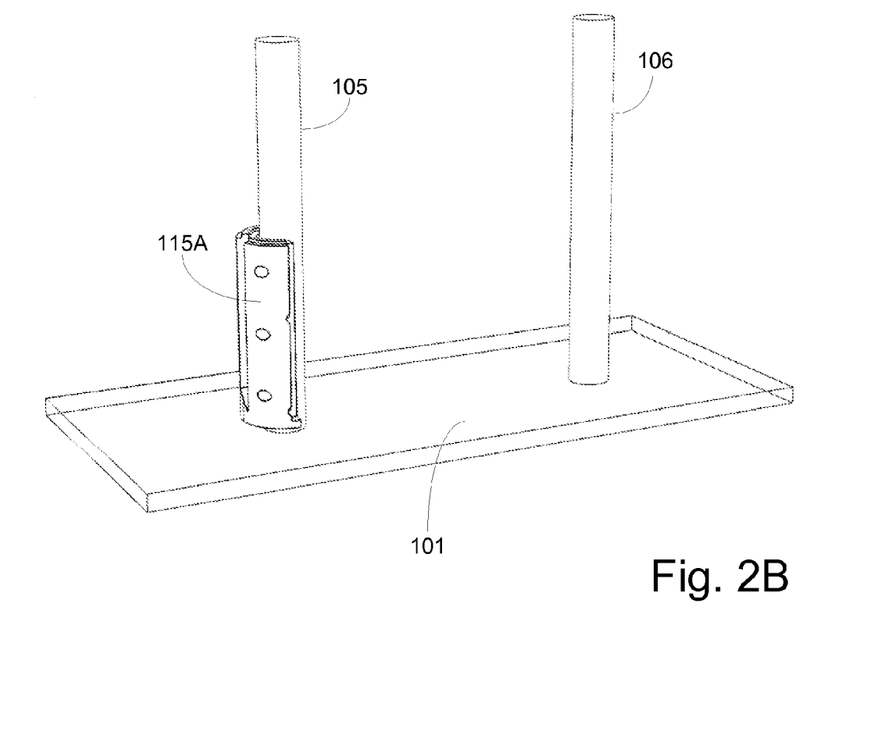

Turning to FIG. 2B, a first post clamp 115A is positioned against post 105. At FIG. 2C, a post clamp 115B is positioned on post 105 opposite of post clamp 115A such that the post clamp pair 115 substantially surrounds post 105, i.e. post clamp pair 115 "sandwiches" post 105. As can further be seen in FIG. 2C, the mating of post clamps 115A, 115B serves to create a vertical deadman slot 130. Moreover, a series of through-bolt holes 135A, 135B in each of the post clamps 115A, 115B align such that through-bolts or other fastening devices may be inserted to secure the post clamps 115A, 115B to each other and around the post 105.

Figure 2C:
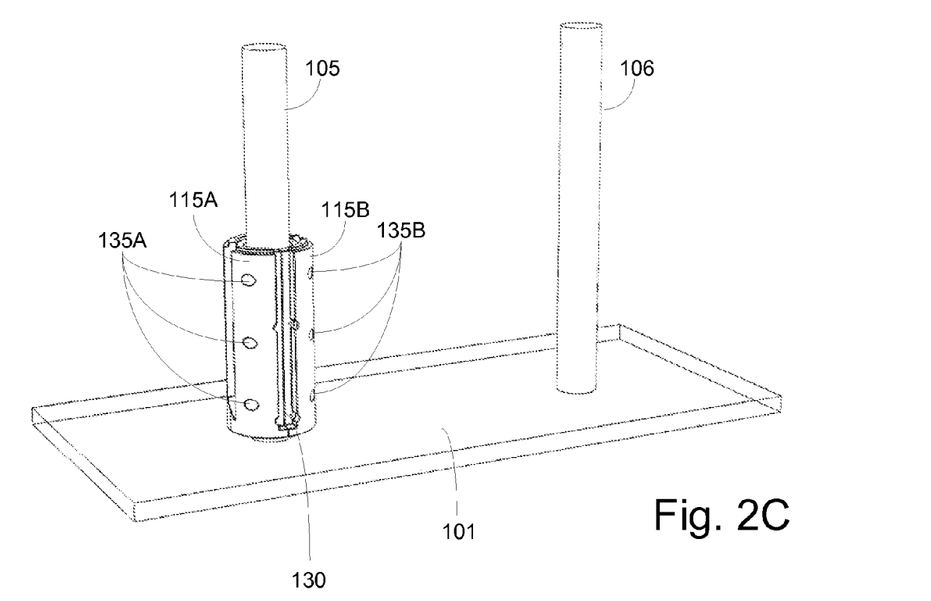
Figure 2D:
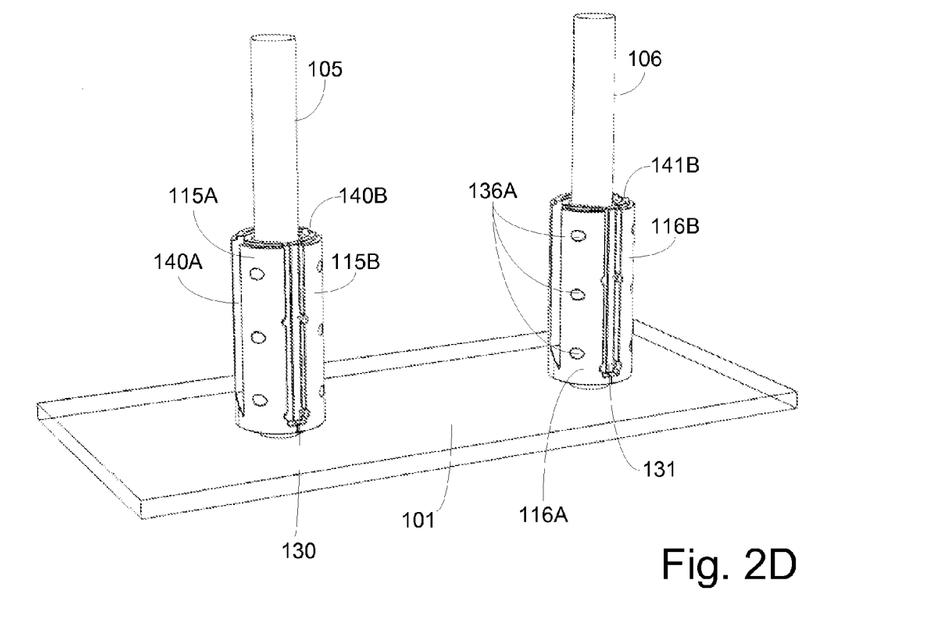

FIG. 2D illustrates that post clamps 116A, 116B are installed on post 106 in the same manner as has been described relative to post clamps 115A, 115B in FIGS. 2B-2C. Similar to the post clamp pair 115, the post clamp pair 116 is secured to post 106 via a series of fastening devices, such as through-bolts, installed through holes 136A, 136B. Notably, once post clamp pairs 115, 116 are secured to posts 105, 106, opposing vertical wall slots 140B (on post clamp 115B) and 141A (on post clamp 116A) are substantially aligned to define a plane between posts 105 and 106. As will be further shown and described, the wall slots 140, 141 are useful for receiving cross-members that collectively define a wall or barrier on the plane defined by the wall slots 140, 141.

Figure 2E:
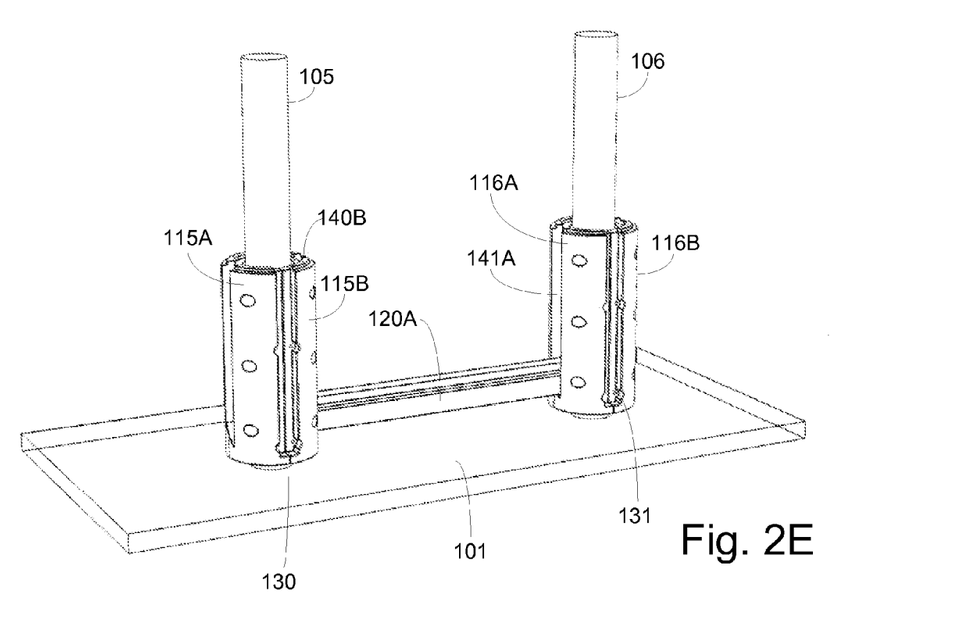

Turning now to FIG. 2E, a first cross-member 120A is inserted lengthwise between post clamps 115B and 116A such that its ends are received into the wall slots 140B and 141A. In the exemplary REAF system 100 depicted in FIG. 2, the cross-members 120 are received into the top of the wall slots 140, 141 and lowered into position. It is envisioned, however, that other REAF system embodiments may receive cross-members into position via different means, according to the specific configuration of the given embodiment and, as such, the scope of a REAF system will not be limited to include only embodiments that are configured to receive cross-members into the top of vertical wall slots of the post clamps.

Figure 2F:
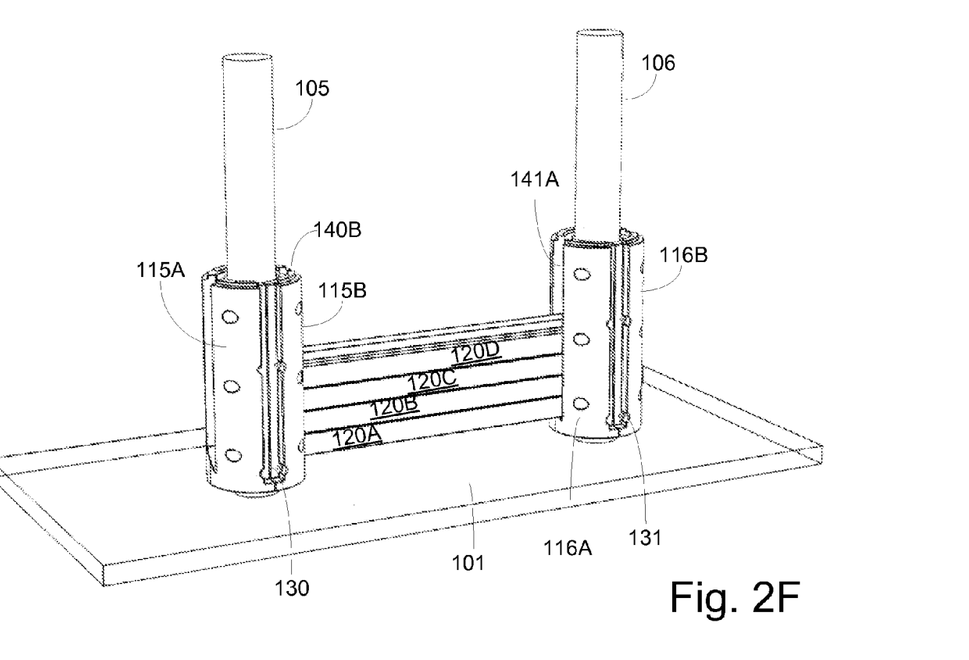
Figure 2G:
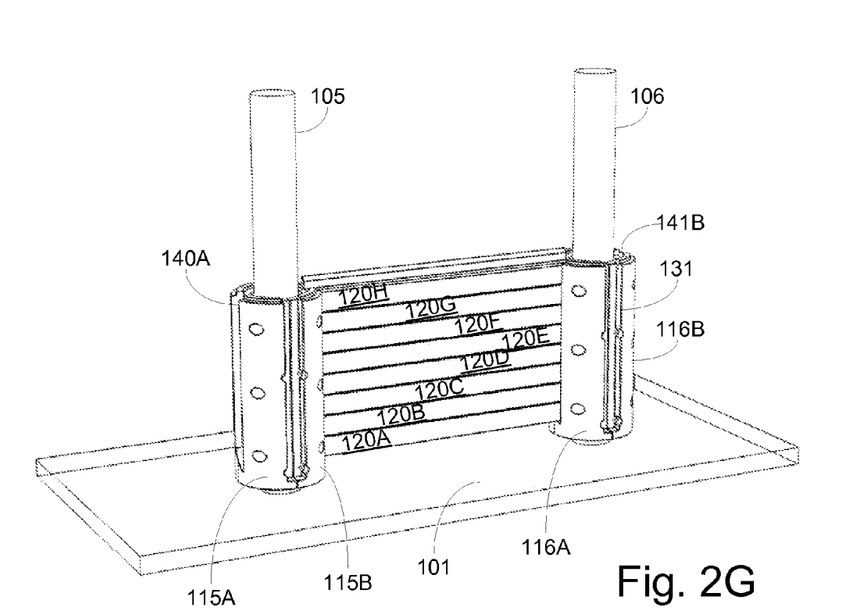

FIG. 2F depicts the exemplary REAF system 100 with three more cross-members 120B-120D received into the wall slots 140B, 141A and lowered into position. Notably, as one of ordinary skill in the art would recognize, cross-members 120A-120D are collectively operating to define a wall between posts 105 and 106. Turning to FIG. 2G, four more cross-members 120E-120H are depicted as having been received into the wall slots 140B, 141A on top of cross-members 120A-120D. Accordingly, a wall 120 has been formed between the posts 105 and 106.

As can be understood from the FIG. 2G illustration, additional post clamp pairs (not depicted) may be installed atop post clamp pairs 115, 116 such that the vertical wall slots 140, 141 are extended up the posts 105, 106. Accordingly, and as one of ordinary skill in the art would recognize, wall 120 may be extended with additional cross-members 120I-120n when additional post clamp pairs are installed in series up the posts 105, 106.

Figure 2H:
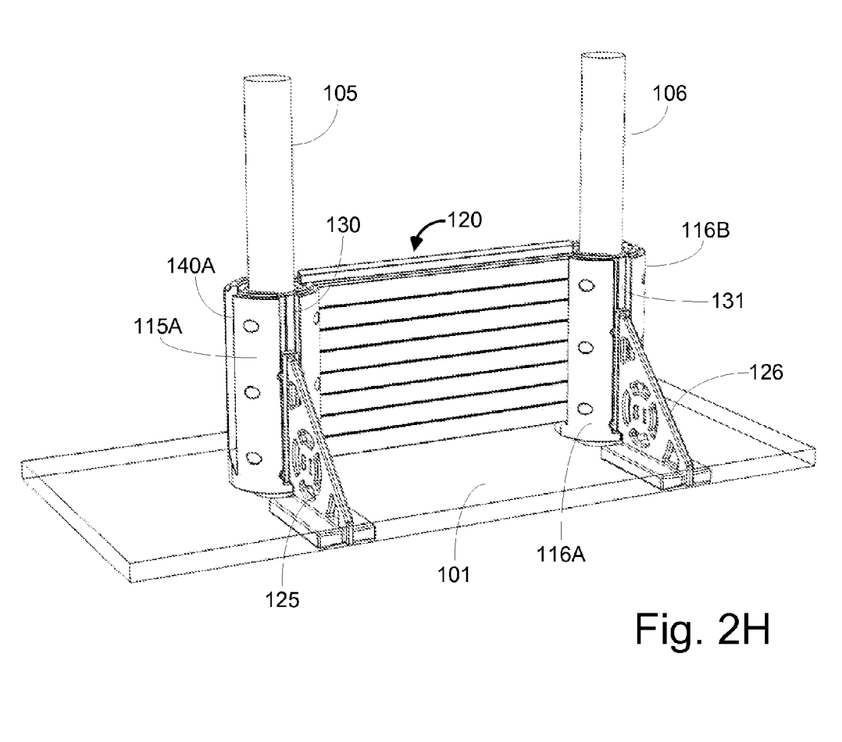

Turning now to FIG. 2H, a pair of deadman components 125, 126 are received into deadman slots 130 and 131, respectively. As would be understood by one of ordinary skill in the art, the deadman components 125, 126 may include a lip or other feature that operates to lock the deadman component 125, 126 into the deadman slot 130, 131 by virtue of mating with a recess or groove aspect of the slot 130, 131. Notably, it is envisioned that the deadman components 125, 126 may include any feature useful for securing it to the post clamps 115, 116 and, as such, one of ordinary skill in the art will understand that the particular shape or configuration of a deadman anchor component that may be included in a particular REAF system embodiment will not limit the scope of what constitutes a REAF system. Some REAF systems may include one or more deadman anchor components while other REAF systems may not include a deadman component at all. Moreover, it is envisioned that a deadman anchor component may take any form useful for serving the purpose of a deadman anchor component, as would be understood by one of ordinary skill in the art of retaining walls or bulkheads.

Figure 2I:
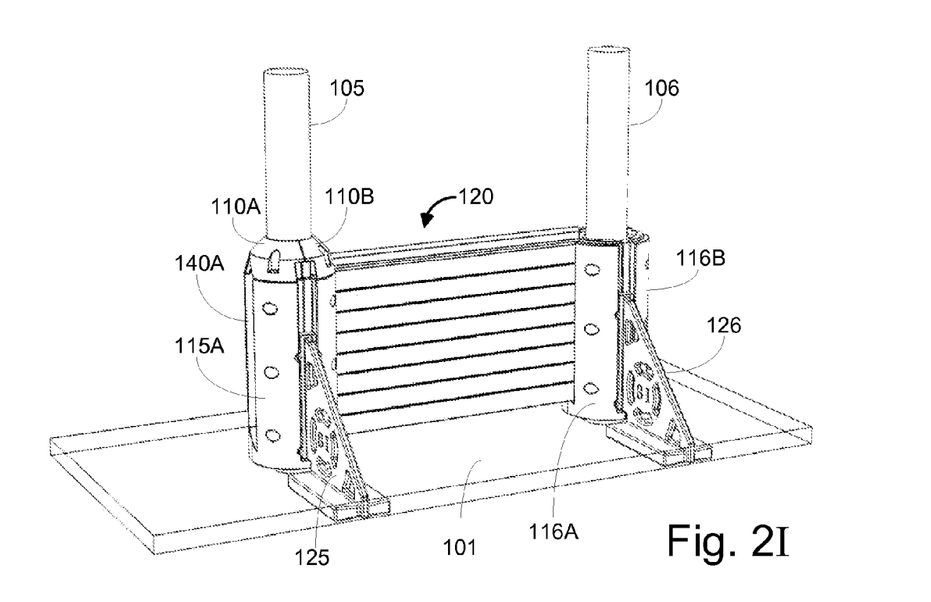
Figure 2J:
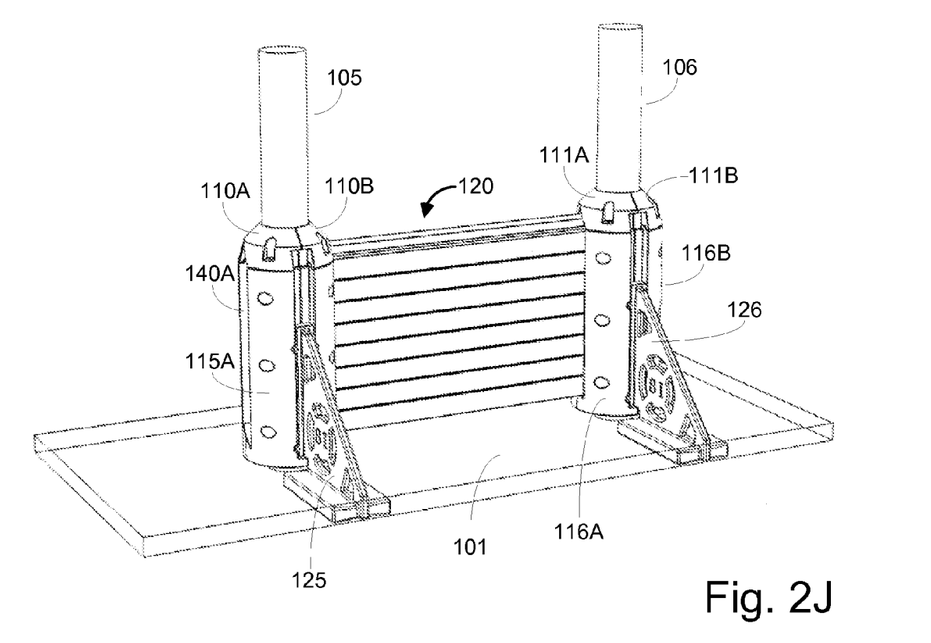

Turning now to FIG. 2I, locking caps 110A, 110B are installed atop the wall 120 and post clamp pair 115, thereby securing the cross-members 120A-120H that form wall 120 in the vertical wall slot 140B. In the exemplary REAF system 100, locking caps 110A, 110B are positioned against post 105 and fastened to post clamps 115A, 115B, respectively. The locking cap pair 110 may be secured to post clamp pair 115 or, in some embodiments, may be secured to each other and/or post 105. FIG. 2J depicts a second locking cap pair 111 secured in place atop post clamp pair 116 on post 106. Once locking cap pairs 110, 111 are secured, wall 120 is secured in wall slots 140A, 141B.

Figure 3:
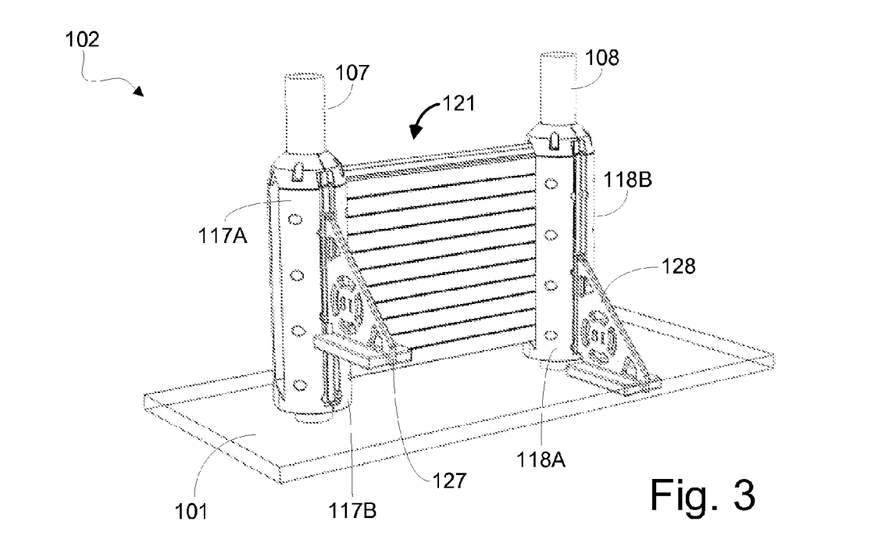
FIG. 3 is a perspective view of a portion of an exemplary REAF system which is relatively taller than the exemplary REAF system of FIG. 1, illustrated with "deadman" anchor components adjusted at varying heights.

FIG. 3 is a perspective view of a portion of an exemplary REAF system 102 which is relatively taller than the exemplary REAF system 101 of FIG. 1. As explained above, it is envisioned that some embodiments of a REAF system may include multiple post clamp pairs installed in series up a particular post. However, it is also envisioned that certain embodiments such as, for example, REAF system 102 may simply include post clamp pairs that are tall enough to preclude the need to install multiple post clamp pairs on a single post. Referring to the FIG. 3 embodiment, it can be seen that post clamp pairs 117, 118 are relatively taller than exemplary post clamp pairs 115, 116 of FIGS. 1-2. As such, wall 121 is also taller than wall 120 and may be better suited for a given shoreline preservation application.

Also, as depicted in FIG. 3, the deadman anchor components 127, 128 are adjusted at varying heights. The ability to adjust the heights of the deadman anchor components in some embodiments of a REAF system may prove advantageous as dirt, sand and sediment accretes over time on the backside of the REAF system. That is, depending on the relative height of the ground on the backside of the REAF system 102 as compared to the height of the ground on the opposite side, the deadman anchor components 125-128 may be adjusted up or down to ensure that their function of providing additional support to the overall system is optimized. Moreover, and further regarding the deadman anchor components that may be included in certain embodiments of a REAF system, it is envisioned that additional deadman anchor cross-members (not shown) may be positioned in parallel with the wall 120, 121.

Figure 4:
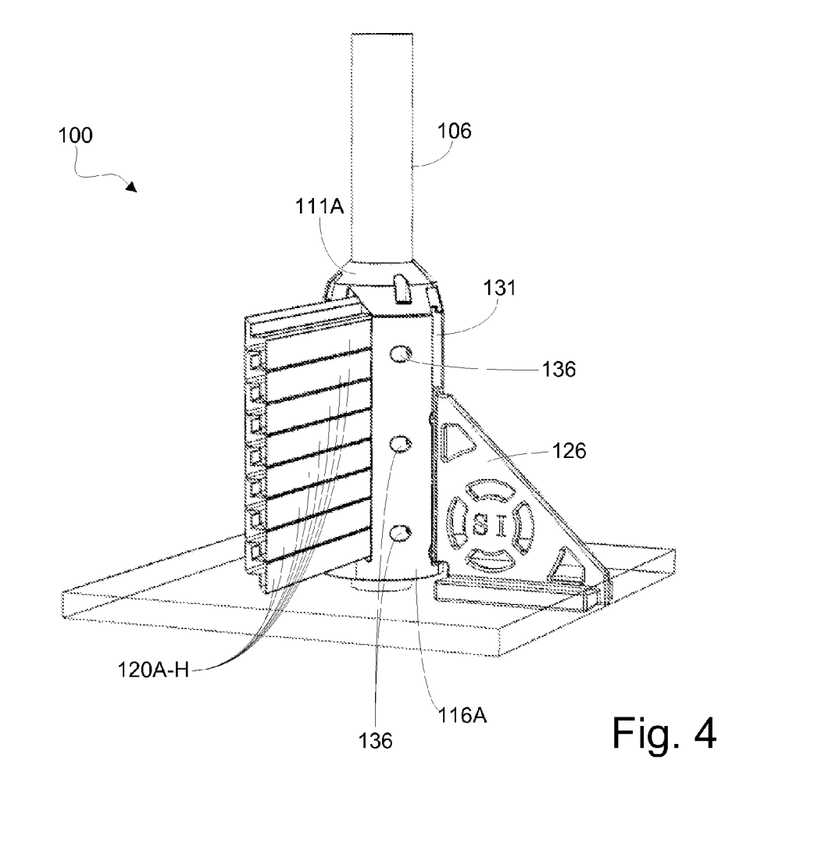
FIG. 4 is a perspective cross-sectional view of the exemplary REAF system of FIG. 1.

FIG. 4 is a perspective cross-sectional view of the exemplary REAF system 100 of FIG. 1. In the FIG. 4 illustration, it can be seen that the cross-members 120 have a cross-section in the form of a "z." Notably, it is envisioned that cross-members of various embodiments of a REAF system may have any number of cross-sectional shapes in addition to, or in lieu of, the exemplary "z" cross-section of the cross-members 120. For instance, it is envisioned that some embodiments of a REAF system may use cross-members with a hollow diamond-shaped cross section. Other embodiments may use polyvinyl chloride ("PVC") pipe, with a circular cross-section, as cross-members. Other cross-member profiles are envisioned.

An advantage of using cross-members with a z-shaped profile, such as cross-members 120, is that a torturous flow path is created between adjacent cross-members that form wall 120. As one of ordinary skill in the art would understand, water and sediment crashing into the front side (the side of wall 120 opposite of the deadman anchor component 126) of the REAF system 100 may flow between the stacked cross-members 120A-H to reach the backside of the system 100. In doing so, the water and sediment is forced to enter between upper and lower adjacent cross-members where it impacts the back wall of the upper cross-member before flowing downward and out to the backside of the system. The torturous path operates to absorb energy from the wave and also causes the sediment to drop out of suspension. Further, as the water that makes it through the wall 120 to the backside of the system 100 recedes back through the torturous path, significant amounts of sediment are prevented from traveling with it. More detail regarding the function of a REAF system is depicted and described relative to FIG. 8.

Figure 5A:
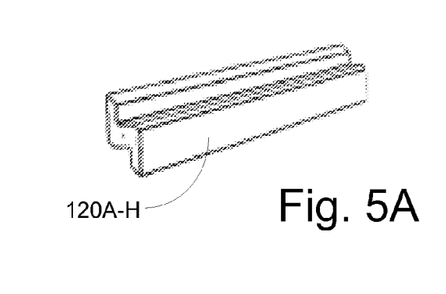
FIGS. 5A-5D illustrate various components of the exemplary REAF system of FIG. 1 including a "z" cross-member, a deadman anchor component, a pair of post clamps, a pair of locking caps and a slip-on post clamp.
Figure 5B:
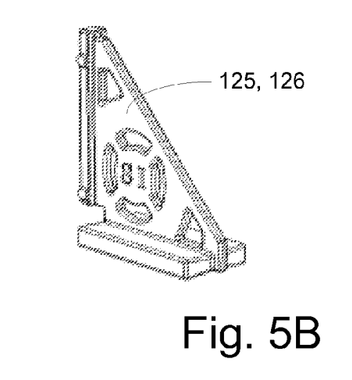
Figures 5C, 5D:
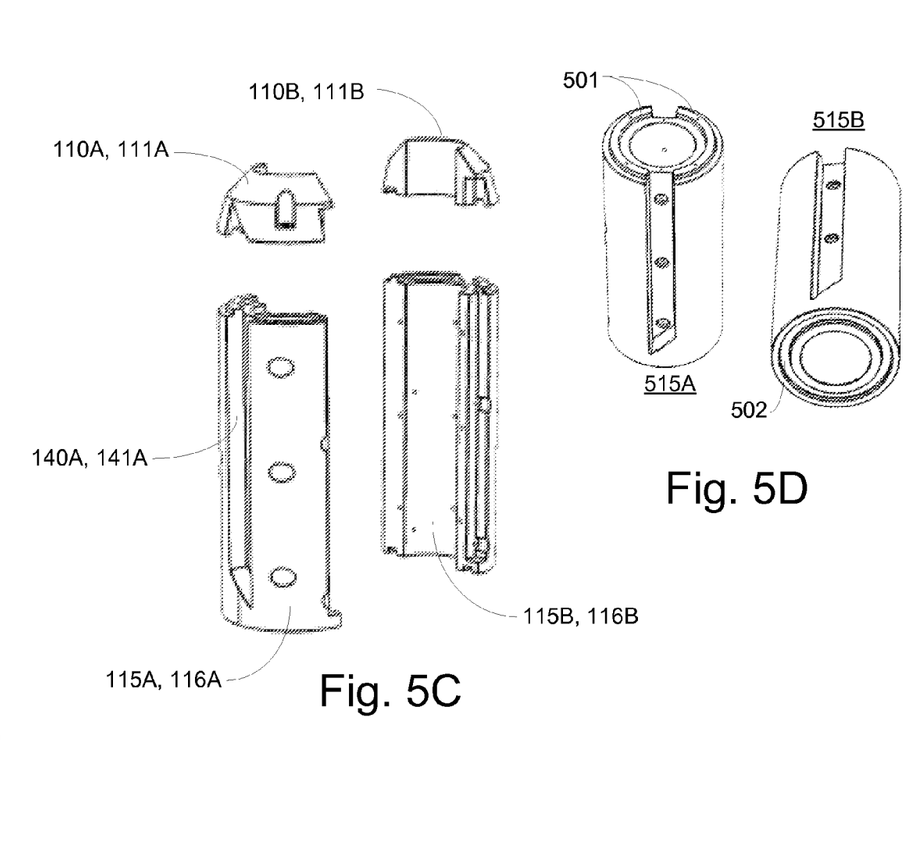

FIGS. 5A-5D illustrate in more detail various components of the exemplary REAF system 100 of FIG. 1 as well as components that may be included in other embodiments of a REAF system. FIG. 5A depicts a single cross-member 120A-H having a z-shaped cross-sectional profile. FIG. 5B depicts an exemplary deadman anchor component 125, 126. FIG. 5C depicts a pair of post clamps 115, 116 and a pair of locking caps 110, 111.

FIG. 5D illustrates an upper perspective view 515A and a lower perspective view 515B of an exemplary slip-on post clamp 515. From the FIG. 5D illustration, it can be seen that certain embodiments of a post clamp may be constructed of a single body such that its installation onto a post requires that it be "slipped" onto the post and then positioned. It is envisioned that a slip-on post clamp 515 may be an alternative to a post clamp pair in some applications.

Moreover, in the FIG. 5D illustration, tongue 501 and groove 502 aspects can be seen on the upper and lower surfaces of the slip-on post clamp. Notably, although the tongue 501 and groove 502 aspects are clearly shown in connection with the slip-on embodiment of a post clamp 515, it is envisioned that other embodiments of a post clamp, as well as other components within a given REAF system embodiment, may include tongue and groove features or other means useful for mechanically positioning and connecting one component with another. For instance, it can be seen in the FIG. 5C embodiments that the post clamp pairs 115, 116 feature tongue aspects on their upper surfaces. Similarly, it can also be seen that the locking cap components 110, 111 feature groove aspects on their lower surfaces. Further, and as one of ordinary skill in the art would understand, use of the tongue and groove connection means between components of a given REAF system may improve the overall structural rigidity of the system as well as provide for scalability of the system such as by stacking post clamps, one atop the other, to increase a wall height.

Further to the FIG. 5 illustrations, and to all embodiments of components that may be included in a given REAF system, it is envisioned that any REAF system component may be solid in construction or hollow in construction. It is envisioned that an advantage of hollow components is that they may be filled or "choked" with materials such as structural foam, water, sand, concrete, etc. As one of ordinary skill in the art will recognize, REAF system components configured to be choked or filled may be less expensive to manufacture than comparable solid components. Moreover, the structural rigidity of the components may be improved and/or the weight of the components optimized.

Figures 6A, 6B, 6C:
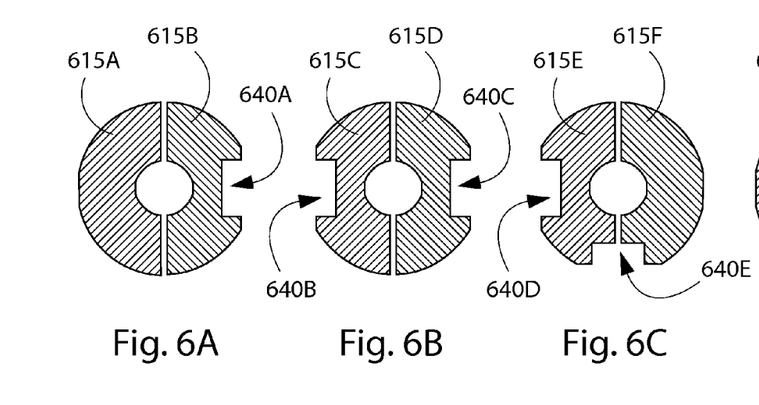
FIGS. 6A-6F illustrate cross-sections of exemplary post clamp pairs that may be included in various embodiments of a REAF system.

FIGS. 6A-6F illustrate cross-sections of exemplary post clamp pairs that may be included in various embodiments of a REAF system. Referring to FIG. 6A, an exemplary post clamp pair 615A, 615B includes a circular center cavity profile and a wall slot 640A. As has been described and depicted in the previous figures, a wall slot such as wall slot 640A is a substantially vertical channel in a post clamp for receipt of cross-members such as cross-members 120A-H. Post clamp 615A may be absent a wall slot for the purpose of providing an aesthetically pleasing view of the end of a given REAF system installation.

FIG. 6B depicts an exemplary post clamp pair 615C, 615D with a circular center cavity profile and a pair of wall slots 640B, 640C. As can be understood from various figures in this specification, each wall slot 640B, 640C may be positioned opposite to a complimentary wall slot in an adjacent post clamp pair, thereby each receiving cross-members that form different wall sections of a given REAF system. A post clamp pair such as post clamp pair 615C, 615D provides for adjacent walls (each formed from a plurality of cross-members) in a given REAF system which are positioned in substantially the same plane.

FIG. 6C depicts an exemplary post clamp pair 615E, 615F with a circular center cavity profile and a pair of wall slots 640D, 640E. As can be seen in FIG. 6C, the wall slot 640D is unique to post clamp 615E while wall slot 640E is formed by virtue of a complimentary notches along the edges of each of post clamps 615E and 615F. In this way, the wall slots 640D and 640E are positioned substantially ninety degrees apart so that adjacent wall sections of a given REAF system may be perpendicular.

Figure 6D:
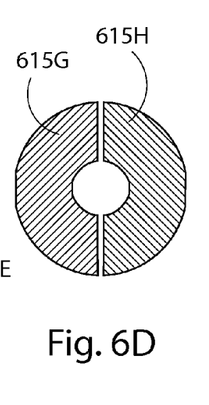
Figure 6E:
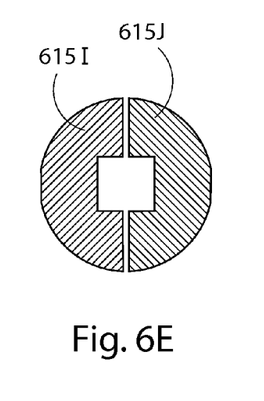

FIG. 6D depicts an exemplary post clamp pair 615G, 615H with a circular center cavity profile and no wall slots. A post clamp pair such as that which is depicted in FIG. 6D may be custom configurable such that wall slots are milled at positions uniquely suited for a given application of a REAF system. For example, it is envisioned that adjacent walls of cross-members in a REAF system application may require positioning relatively to each other at custom angles. In such an application, a "blank" post clamp pair may be configured in the field with wall slots at the desired positions.

Moreover, it will be understood that the exemplary embodiments of post clamp pairs depicted in the FIG. 6 illustrations are being offered for exemplary purposes only and are not meant to suggest that a REAF system is limited to include only those post clamp pair combinations. It is also envisioned that center profiles may take any cross-sectional shape that is suitable to mounting to a given post, pylon or piling.

Notably, the exemplary REAF system embodiment 100 shown and described relative to the previous figures assumed mounting to a series of cylindrical pilings, pylons or posts; however, as mentioned in the previous paragraph it is envisioned that some embodiments of a REAF system may be mounted to posts that are not cylindrical. For example, the post clamp pair 615I, 615J depicted in FIG. 6E includes a center cavity profile in the form of a square for mounting to posts having a square cross-section. As would be understood by one of ordinary skill in the art, an advantage of using post clamp pairs with non-circular center cavity profiles (such as a square center cavity profile) in conjunction with non-cylindrical posts is that rotation of the post clamp pair around the post may be alleviated without having to risk compromising the structural integrity of the post with fasteners or through-bolts.

Figure 6F:
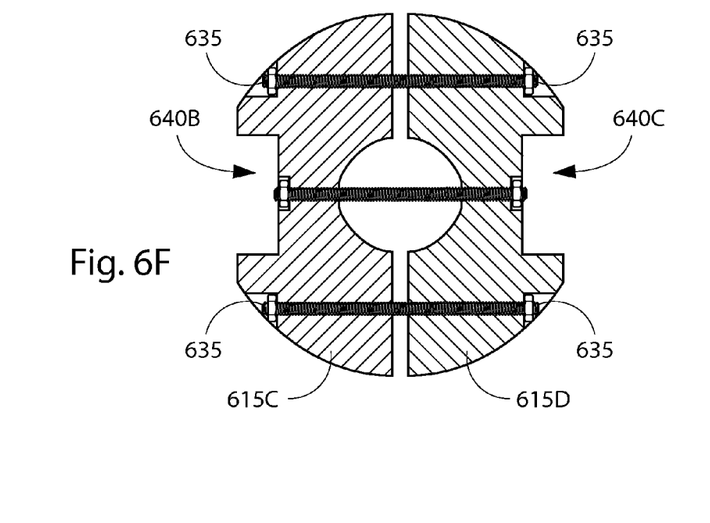

FIG. 6F depicts a more detailed view of the exemplary post clamp pair 615C, 615D previously described relative to FIG. 6B. In the FIG. 6F illustration, the through-bolt holes 635 can be seen. As previously described, a post clamp pair such as pair 615C, 615D may be mounted to a post such that the post is "sandwiched" between them and then mechanically fixed to each other via a through-bolt or equivalent fastening means. Also depicted in the FIG. 6F illustration is a center-bolt 650. It is envisioned that some embodiments of a REAF system may require one or more center-bolts 650 or equivalent fastening means to connect the post clamp pair through the post itself. In this way, the possibility of spinning or turning of the post clamp pair around the post may be eliminated.

Figure 7A:
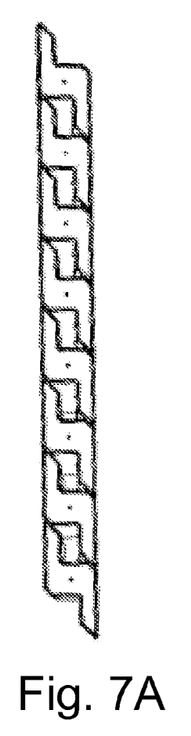
FIGS. 7A-7C illustrate cross-sections of exemplary wall sections made of cross-members that may be included in some embodiments of a REAF system.
Figure 7B:
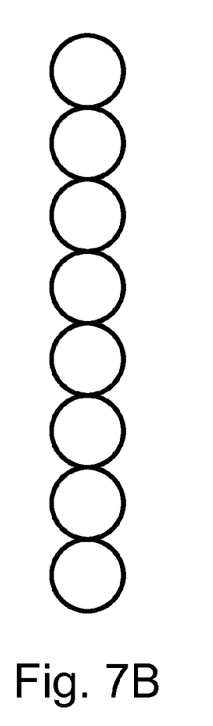
Figure 7C:
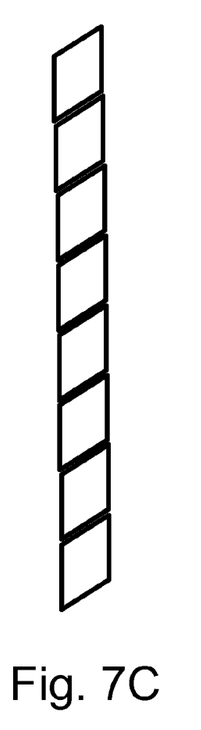

FIGS. 7A-7C illustrate cross-sections of exemplary wall sections made of cross-members that may be included in some embodiments of a REAF system. FIG. 7A illustrates a cross-section of a wall section formed from of a plurality of cross-members having z-shaped cross-sectional profiles. FIG. 7B illustrates a cross-section of a wall section formed from of a plurality of cross-members having circular cross-ssectional profiles, such as may be accomplished via use of PVC pipe as a material of construction for cross-members. FIG. 7C illustrates a cross-section of a wall section formed from a plurality of cross-members having diamond shaped cross-sectional profiles. The cross-member and wall section embodiments illustrated in FIG. 7 are offered for exemplary purposes only and are not meant to limit the scope of potential cross-sectional profiles for cross members that may be used in a given REAF system. Other cross-sectional profiles for cross members in a REAF system are envisioned.

Figure 8:
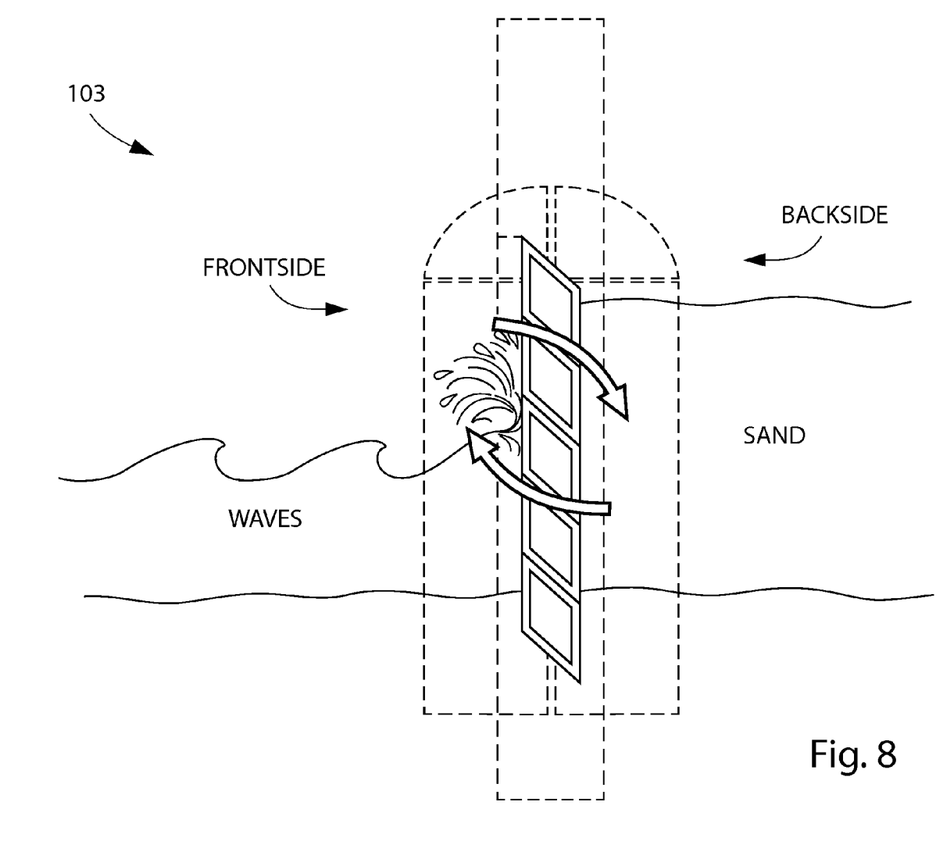
FIG. 8 illustrates an exemplary REAF system with diamond-shaped cross-members being used in an application to mitigate erosion of a shoreline.

FIG. 8 illustrates an exemplary REAF system 103 with cross-members having diamond shaped profiles. In the FIG. 8 illustration, the REAF system 103 is being used in an application to mitigate erosion of a shoreline. As can be understood from the upper arrow, as a wave of water contacts the frontside of the REAF system 103, water and suspended sediment is forced through and between adjacent cross-members. Energy carried by the wave is dissipated by virtue of the wave coming into contact with the REAF system 103 and the water having to navigate through the narrow openings between adjacent cross-members. It is envisioned that some embodiments of a REAF system may include cross-members which are formed form a material that is somewhat flexible such that, when a wave contacts a wall section formed from the cross-members, the cross-members will temporarily flex to widen the gaps between adjacent cross-members.

Returning to the FIG. 8 illustration, once the water and sediment carried by a wave passes through the wall section of the REAF system 103, sand and sediment accretes or accumulates on the backside of the system 103 while the water finds its way back through the system 103 (as represented by the lower arrow). In this way, the integrity of the shoreline on the backside of the REAF system 103 is maintained as well as the integrity of the installation of the various pilings that support the REAF system 103.

Figure 9:
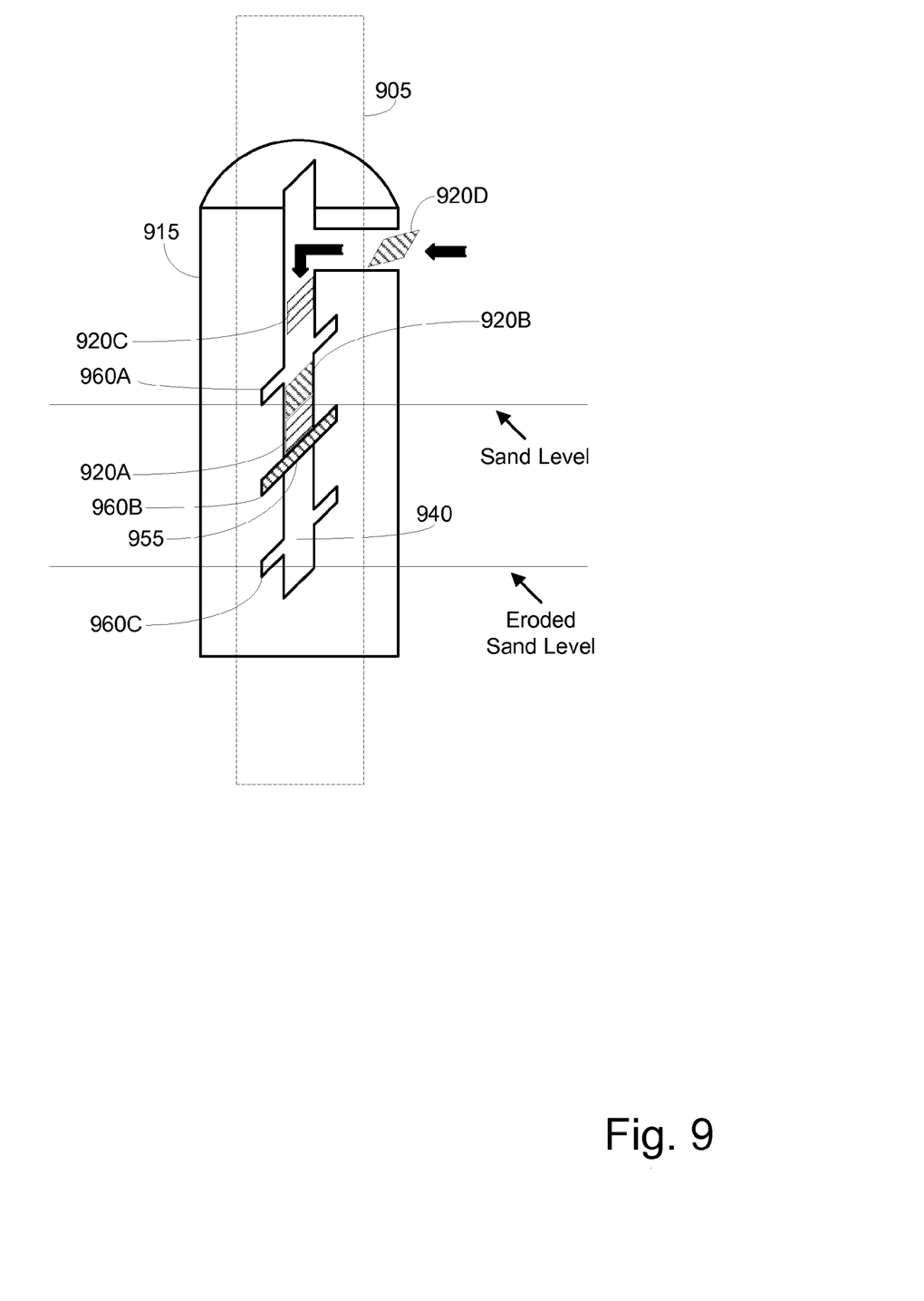
FIG. 9 illustrates an exemplary REAF system with diamond-shaped cross-members being inserted into a side port aspect of an exemplary post clamp that includes an adjustable bottom stop feature.

FIG. 9 illustrates an exemplary REAF system with diamond-shaped cross-members 920 being inserted into a side port aspect 950 of an exemplary post clamp 915 that includes an adjustable bottom stop feature. As can be seen in the FIG. 9 illustration, a side port aspect 950 may be included in some embodiments of a post clamp. It is envisioned that an advantage of a post clamp with a side port is that REAF systems using such a post clamp 915 may be constructed in applications with inadequate headroom to accommodate installation of cross members from the top (such as was described relative to FIG. 2). Some embodiments may also include a plug (not depicted) or other means for securing the port once the desired amount of cross-members are installed.

Further, the exemplary post clamp 915 also includes an adjustable bottom stop in the form of bottom stop slots 960. As shown in FIG. 9, a bottom stop 955 is located in bottom stop slot 960B such that cross-members 920 form a wall section up from the position of bottom stop slot 960B. As one of ordinary skill in the art would understand, by adjusting the position of bottom stop 955 to other bottom stop slots 960, the lower edge of a wall section may be adjusted.

As an example of an application where it may be desirable to adjust the position of a bottom stop feature in a REAF system, the FIG. 9 illustration includes a sand level line and an eroded sand level line. With the bottom stop 955 adjusted in the wall slot 940 at bottom stop slot 960B, the sand may accrete on the backside of the REAF system at the sand level. In the event that environmental conditions drastically change such that the sand level is eroded (perhaps by a flood or severe storm), the sand behind the REAF system may erode to the eroded sand level. At such point, it may be desirable to adjust and redefine the position of the lower edge of the wall section. Advantageously, the bottom stop 955 may be lowered to the bottom stop slot 960C, thereby lowering the wall section to the eroded sand level.

Figure 10:
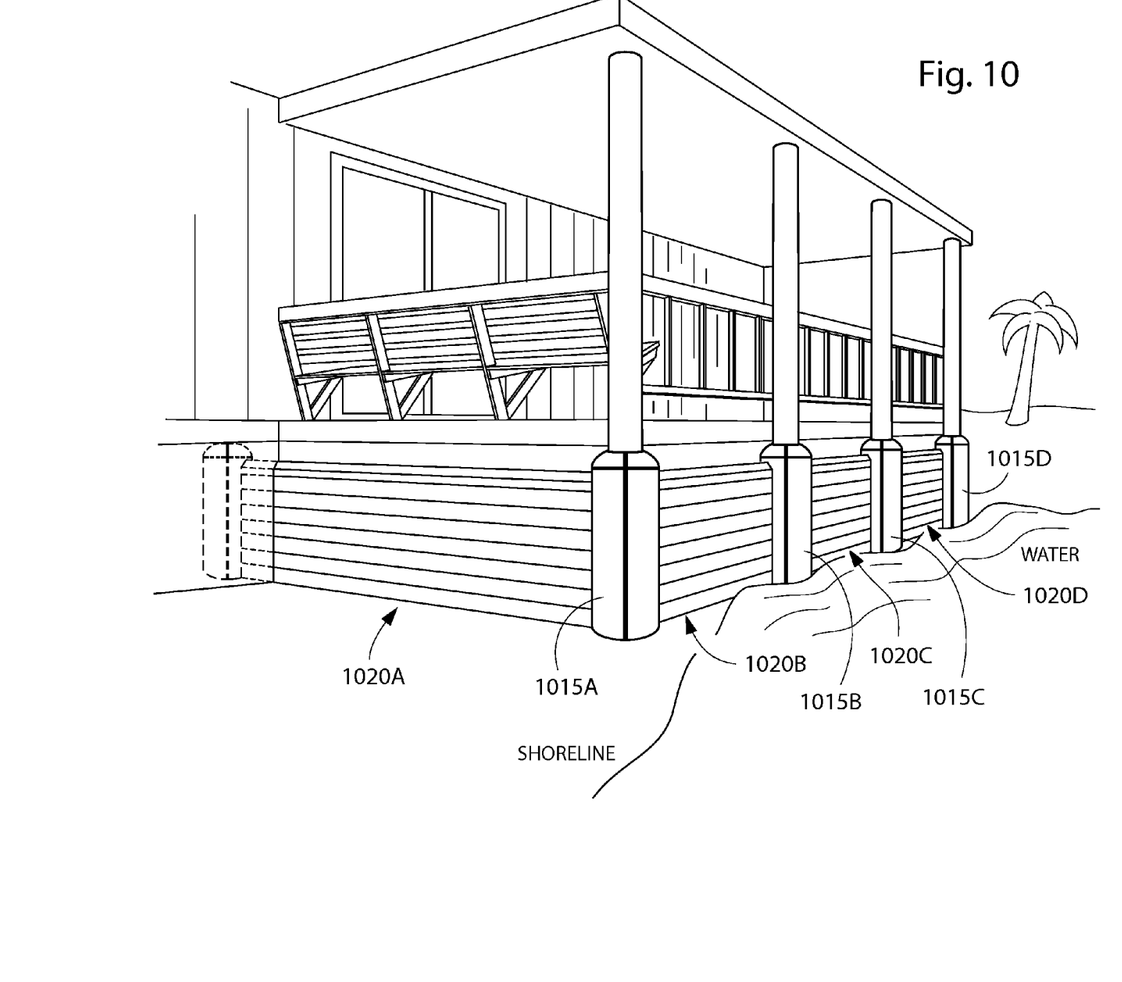
FIG. 10 illustrates an exemplary installation of a REAF system to a series of pylons supporting a deck structure.

FIG. 10 illustrates an exemplary installation of a REAF system to a series of pylons supporting a deck structure. In the FIG. 10 illustration, a series of wall sections 1020 are mounted between post clamp pairs 1015 to form an exemplary REAF system on the pylons beneath the deck. Notably, wall section 1020 is positioned substantially ninety degrees from wall section 1020B by virtue of the wall slot positioning in post clamp pair 1015A. Also, wall sections 1020B, 1020C and 1020D are positioned substantially along the same plane by virtue of the wall slot positioning on post clamp pairs 1015B, 1015C and 1015D. Advantageously, because of the exemplary REAF system the shoreline integrity is preserved and the water line remains exterior to the deck pilings.

Systems, devices and methods for shoreline preservation have been described using detailed descriptions of embodiments thereof that are provided by way of example and are not intended to limit the scope of the disclosure. The described embodiments comprise different features, not all of which are required in all embodiments of a REAF system. Some embodiments of a REAF system utilize only some of the features or possible combinations of the features. Variations of embodiments of a REAF system that are described and embodiments of a REAF system comprising different combinations of features noted in the described embodiments will occur to persons of the art.

Further, certain steps in the methods described in this specification naturally precede others for the REAF system to function as described. However, installation and use of a REAF system is not limited to the order of the steps described if such order or sequence does not alter the functionality of the REAF system. In some instances, certain steps for installing and using a REAF system may be omitted or not performed without departing from the scope of the disclosure. Further, words such as "thereafter", "then", "next", etc. are not intended to limit the order of the steps. These words are simply used to guide the reader through the description of the exemplary method.

Therefore, although selected aspects have been illustrated and described in detail, it will be understood that various substitutions and alterations may be made therein without departing from the spirit and scope of the present invention, as defined by the following claims.

What is claimed is:

1. A system for shoreline preservation along a line defined by a plurality of posts, the system comprising:
   first and second post clamp pairs, each comprised of a left post clamp half and a right post clamp half, wherein:
      the first post clamp pair is mounted to a first post and the second post clamp pair is mounted to a second post;
      the first and second posts are adjacent such that the right post clamp half of the first post clamp pair faces the left post clamp half of the second post clamp pair;
      each post clamp pair is mounted to its respective post by one or more fasteners that fixedly connect the pair together; and
      each of the right post clamp half of the first post clamp pair and the left post clamp half of the second post clamp pair comprise a substantially vertical wall slot; and
   one or more cross-members are received into the wall slots such that a wall section is formed in a space defined between the first and second posts.

2. The system of claim 1, further comprising a pair of locking cap components mounted atop each of the post clamp pairs, wherein the locking cap components are operable to retain the one or more cross-members in the wall slots.

3. The system of claim 1, further comprising at least one deadman anchor component and wherein at least one of the post clamp pairs further comprises a deadman slot for receiving the deadman anchor component.

4. The system of claim 3, wherein the position of the deadman anchor component is vertically adjustable.

5. The system of claim 1, wherein the one or more cross-members comprise a cross-sectional profile in the shape of a diamond.

6. The system of claim 1, wherein the one or more cross-members comprise a cross-sectional profile in the shape of a "Z."

7. The system of claim 1, wherein the one or more cross-members comprise a cross-sectional profile in the shape of a circle.

8. The system of claim 7, wherein the one or more cross-members are constructed from a polyvinyl chloride ("PVC") pipe.

9. The system of claim 1, wherein the first and second posts are cylindrical and the post clamp pairs comprise a circular center cavity profile.

10. The system of claim 1, wherein the first and second posts have a square cross-sectional profile and the post clamp pairs comprise a square center cavity profile.

11. The system of claim 1, further comprising at least one center-bolt fastener extending through a post clamp pair and post, wherein the at least one center-bolt fastener operates to prevent the post clamp pair from spinning on the post.

12. The system of claim 1, further comprising:
a third post clamp pair comprised of a left post clamp half and a right post clamp half, wherein:
the third post clamp pair is mounted to a third post;
the third post is adjacent to the second post such that the right post clamp half of the second post clamp pair faces the left post clamp half of the third post clamp pair;
the third post clamp pair is mounted to its respective post by one or more fasteners that fixedly connect the pair together; and
each of the right post clamp half of the second post clamp pair and the left post clamp half of the third post clamp pair comprise a substantially vertical wall slot; and
one or more cross-members are received into the walls slots such that a wall section is formed in a space defined between the second and third posts.

13. The system of claim 12, wherein the wall section formed between the first and second posts is substantially in the same plane with the wall section formed between the second and third posts.

14. The system of claim 12, wherein the wall section formed between the first and second posts is positioned at an angle greater than ninety degrees relative to the wall section formed between the second and third posts.

15. The system of claim 1, further comprising:
a third post clamp pair comprised of a left post clamp half and a right post clamp half, wherein:
the third post clamp pair is mounted to a third post;
the third post is adjacent to the second post such that a seam defined by the right and left post clamp halves of the second post clamp pair faces the left post clamp half of the third post clamp pair;
the third post clamp pair is mounted to its respective post by one or more fasteners that fixedly connect the pair together; and
each of the seam defined by the right and left post clamp halves of the second post clamp pair and the left post clamp half of the third post clamp pair comprise a substantially vertical wall slot; and
one or more cross-members are received into the walls slots such that a wall section is formed in a space defined between the second and third posts;
wherein the wall section formed between the first and second posts is substantially perpendicular to the wall section formed between the second and third posts.

16. The system of claim 1, further comprising third and fourth post clamp pairs, each comprised of a left post clamp half and a right post clamp half, wherein:
the third post clamp pair is mounted to the first post above the first post clamp pair and the fourth post clamp pair is mounted to the second post above the second post clamp pair such that the wall section formed in the space defined between the first and second posts is vertically increased.

17. The system of claim 1, wherein the cross-members are constructed from a material that flexes when a wave contacts the wall section such that a gap between adjacent cross-members is temporarily expanded.

18. The system of claim 1, wherein the plurality of posts support a structure other than the shoreline preservation system.

19. The system of claim 1, wherein the post clamp pairs are constructed from one of plastic, galvanized steel and aluminum.

20. The system of claim 1, wherein one or more of the cross-members are constructed from one of plastic, galvanized steel, aluminum and wood.

* * * * *